US007976656B2

(12) United States Patent
Sartoni et al.

(10) Patent No.: US 7,976,656 B2
(45) Date of Patent: Jul. 12, 2011

(54) GUMMING DEVICE AND A METHOD FOR GUMMING A WEB OF WRAPPING MATERIAL

(75) Inventors: Massimo Sartoni, Bologna (IT); Umberto Zanetti, Modena (IT); Gianluca Grazia, Bologna (IT)

(73) Assignee: G.D.S.P.A. (IT)

(*) Notice: Subject to any disclaimer, the term of this patent is extended or adjusted under 35 U.S.C. 154(b) by 0 days.

(21) Appl. No.: 12/638,361

(22) Filed: Dec. 15, 2009

(65) Prior Publication Data

US 2010/0243124 A1 Sep. 30, 2010

(30) Foreign Application Priority Data

Mar. 25, 2009 (IT) .............................. BO2009A0178

(51) Int. Cl.
*B32B 41/00* (2006.01)

(52) U.S. Cl. ..... 156/64; 156/284; 156/308.6; 427/427.2

(58) Field of Classification Search .................... 156/64, 156/356, 357, 575, 578, 284, 308.6; 118/211, 118/244, 259, 262, 663, 669, 698; 131/69; 427/427.2

See application file for complete search history.

(56) References Cited

U.S. PATENT DOCUMENTS

| | | | | |
|---|---|---|---|---|
| 5,221,350 | A * | 6/1993 | Tallier et al. | 118/694 |
| 5,368,893 | A * | 11/1994 | Sommer et al. | 427/348 |
| 6,258,168 | B1 | 7/2001 | Pawelko et al. | |
| 6,521,043 | B1 * | 2/2003 | Spatafora | 118/63 |
| 2005/0022730 | A1 * | 2/2005 | Rizzoli et al. | 118/211 |

FOREIGN PATENT DOCUMENTS

| | | |
|---|---|---|
| DE | 19702364 | 4/1998 |
| EP | 0978321 | 2/2000 |
| EP | 1502661 | 2/2005 |
| EP | 1563746 | 8/2005 |
| WO | 9919077 | 4/1999 |
| WO | 0102101 | 1/2001 |

OTHER PUBLICATIONS

Translation of EP 1 502 661 A2. Robert Buerkle, Feb. 2005, all pages.*

European Search Report dated Nov. 3, 2009 from counterpart Italian application.

* cited by examiner

*Primary Examiner* — George R Koch, III

(74) *Attorney, Agent, or Firm* — Timothy J. Klima; Shuttleworth & Ingersoll, PLC

(57) ABSTRACT

A method of gumming a web of paper material in a filter tip attachment machine is implemented using a gumming device that comprises a gumming roller and a transfer roller counter-rotating tangentially one to another about horizontal and parallel axes, and creating a trough in which to hold a prescribed quantity of adhesive supplied by a feed circuit, also a drive system by which the rollers are set in rotation on their axes, and a control unit to which both the feed circuit and the drive system are interlocked. The gumming roller revolves tangentially to the web of material at a gumming station, and the method envisages a procedure, triggered in the event of a stoppage affecting the machine, that consists in the steps of suspending delivery of the adhesive, distancing the web of paper material from the gumming roller, and reversing the direction of rotation of the rollers, relative to the direction of rotation during normal operation, in such a way that the trough is emptied gradually of adhesive.

13 Claims, 1 Drawing Sheet

GUMMING DEVICE AND A METHOD FOR GUMMING A WEB OF WRAPPING MATERIAL

This application claims priority to Italian Patent Application No. BO2009A000178, filed Mar. 25, 2009, which application is incorporated by reference herein.

BACKGROUND OF THE INVENTION

The present invention relates to a gumming device and to a method for gumming a web of wrapping material.

The invention is applicable, to advantage, for the purpose of automatically emptying and/or cleaning devices by which adhesive is deposited on a web of wrapping material in manufacturing machines used in the tobacco industry, the field to which reference is made explicitly in the following specification albeit with no limitation in scope implied.

More exactly, the present invention relates to a roller type gumming device utilized in a filter tip attachment machine for applying a layer of adhesive to a continuous strip of paper that is then divided up into discrete lengths, or tipping papers, by means of which single filters are joined ultimately to relative cigarette sticks.

Conventionally, a layer of adhesive is applied to the continuous strip or web of paper using a gumming device that comprises a pair of rollers disposed side by side and counter-rotating about horizontal axes, which are urged resiliently one against the other along an area of mutual contact. One of the rollers is a transfer roller, whilst the other is a gumming roller of which the surface revolves tangentially to the continuous strip.

The transfer roller and the gumming roller combine to form a trough, created between mutually opposed portions of the respective cylindrical surfaces located immediately above the area of mutual contact. The space above the trough is occupied by the outlet nozzle of a pipeline connected to a tank containing a supply of adhesive.

Adhesive directed into the trough, which extends the full length of the straight line generator of contact between the two rollers, forms a pool from which to prime the gumming roller.

The direction of rotation induced in the gumming roller is such that a layer of adhesive formed on the cylindrical surface beyond the area of contact with the transfer roller will be transferred in turn to the continuous strip. The depth of the layer of adhesive is regulated by the pressure created along the area of contact between the two rollers.

The adhesive consists normally in a vinyl based product, and the more its chemical and physical properties (temperature, viscosity, bonding power, etc.) can be maintained constant, the more effective and efficient the gumming process will be. With the adhesive properly conditioned, it can be distributed uniformly by the gumming device on the continuous strip. This will happen, in practice, as long as there is always fresh adhesive in the trough above the area of mutual contact between the two rollers of the gumming device.

In reality, given the heat generated by the filter attachment machine during operation, and the pressure generated between the rollers, the temperature of the adhesive occupying the trough will rise, and this tends to degrade the chemical and physical properties of the adhesive.

It has been found, in effect, that under normal operating conditions, the roller type gumming device is unable to keep the adhesive in a suitably fluid state, due to the partial drying effect induced and the consequent formation of lumps. This is a problem that occurs, in particular, during stoppages: in these situations, the web of paper material is distanced from the gumming roller and the delivery of adhesive from the tank suspended, with the result that the pool of adhesive held between the rollers will tend to degrade through stagnation, and must be removed.

This removal operation is performed manually by persons tasked with the job of cleaning the machine, and the additional work involved results in higher servicing costs.

The object of the present invention is to provide a gumming method and a relative device that will be unaffected by the drawbacks mentioned above.

SUMMARY OF THE INVENTION

The stated object is realized according to the present invention in a gumming device for applying an adhesive to a web of wrapping material in a manufacturing machine, typically a filter tip attachment machine, comprising a gumming roller and a transfer roller rotatable about axes disposed horizontal and parallel one with another, turning in opposite directions and engaged in mutual contact at a zone of tangency coinciding with a shared straight line generator, thereby creating a trough between the respective cylindrical surfaces of the rollers at the zone of tangency, in which to hold a predetermined quantity of adhesive, also a feed circuit delivering the adhesive to the trough, drive means by which the rollers are set in rotation about their respective axes, a control unit to which the feed circuit and drive means are interlocked, and a gumming station at which the gumming roller revolves tangentially to the web of wrapping material. To advantage, the drive means can be piloted by the control unit to reverse the direction of rotation of both rollers about their respective axes.

The stated object is realized similarly in a method for gumming a web of wrapping material in a filter tip attachment machine, using a gumming device that comprises a gumming roller and a transfer roller counter-rotating tangentially one to another about horizontal and parallel axes, and creating a trough in which to hold a prescribed quantity of adhesive delivered by a feed circuit, also a gumming station at which the gumming roller revolves tangentially to the web of wrapping material, a drive system by which the rollers are set in rotation on their axes, and a control unit to which the feed circuit and the drive system are interlocked. The method disclosed includes the steps, implemented in the event of the manufacturing machine being affected by a stoppage, of suspending delivery of the adhesive, distancing the web of wrapping material from the gumming roller, and reversing the direction of rotation of the rollers, relative to the direction of rotation during normal operation, in such a way that the trough is emptied gradually of adhesive.

BRIEF DESCRIPTION OF THE DRAWINGS

The invention will now be described in detail with reference to the accompanying FIG. 1, which shows a preferred and non-limitative embodiment of the gumming device, illustrated in a front elevation, partly in section and with parts omitted for clarity.

DESCRIPTION OF THE PREFERRED EMBODIMENTS

Figure 1:
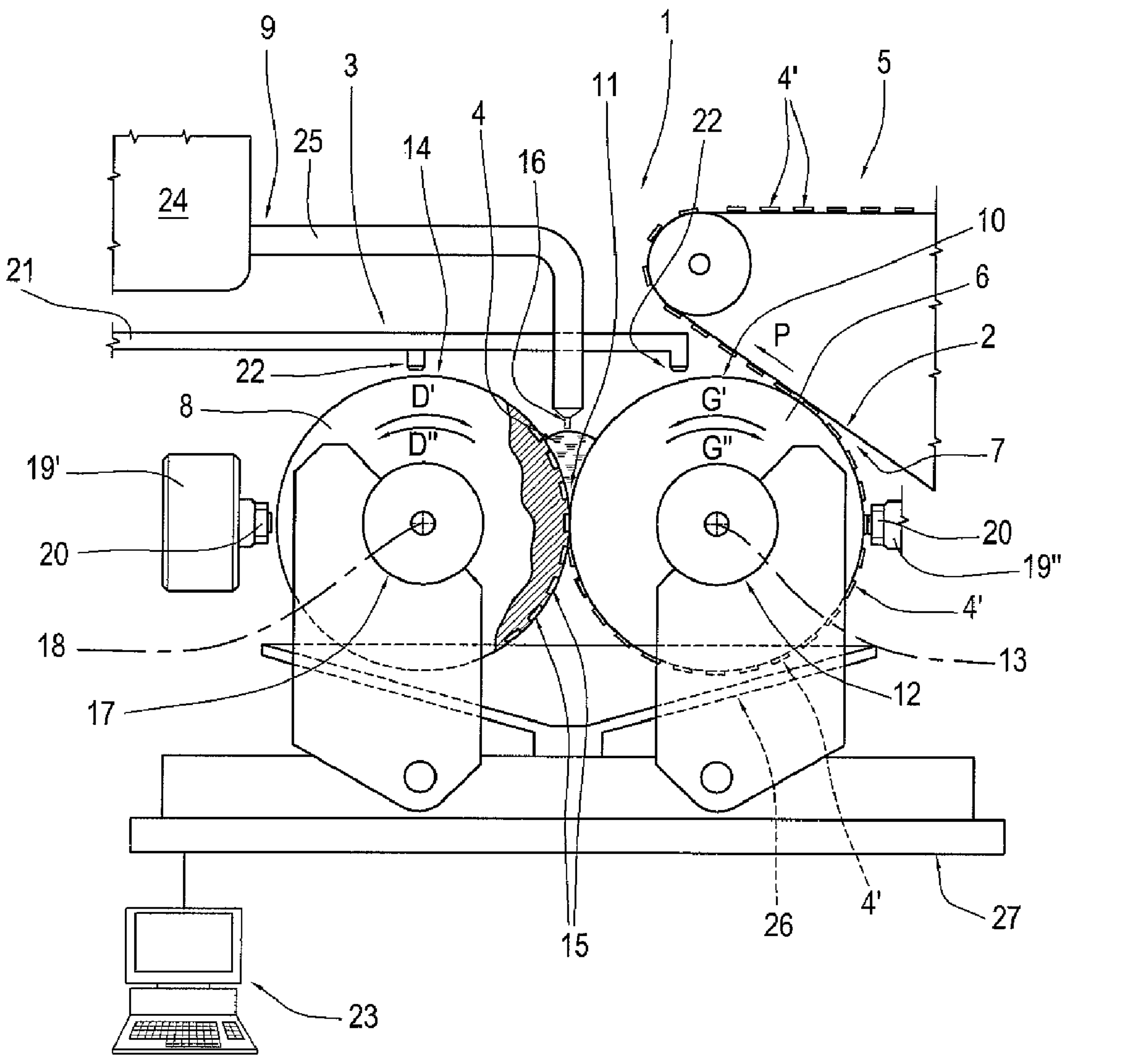

With reference to FIG. 1, numeral 1 denotes a filter tip attachment machine, shown in part only, equipped with a feed unit 5 supplying a continuous strip or web 2 of wrapping material and comprising a gumming device, denoted 3 in its entirety, such as will apply an adhesive 4 to the web 2 as it advances continuously in a direction denoted P before being separated into tipping papers (not illustrated) with which filter tips (not illustrated) are joined to relative cigarette sticks (not illustrated) in the aforementioned machine 1.

The gumming device 3, mounted to respective support means afforded by a base frame 27, comprises a first gumming roller 6 by which a layer 4' of adhesive 4 is applied to the web 2 at a gumming station 7, and a second transfer roller 8, operating in conjunction with the gumming roller 6 in such a way as to release a selected quantity of adhesive 4 for application to the web 2.

Numeral 9 denotes a feed circuit by which the adhesive 4 is delivered continuously to the two rollers 6 and 8.

Finally, the gumming device 3 of the feed unit 5 supplying the web 2 is governed by a control unit denoted 23.

The gumming roller 6, delimited radially by a cylindrical surface 10 revolving tangentially to the web 2 at the gumming station 7, is cantilever-mounted to the free end of a respective drive shaft 12 turning on a horizontal axis 13 and carried by the base frame 27.

The gumming roller 6 is thus set in rotation by the shaft 12 about this same axis 13. In operation, during the gumming process, the roller 6 turns in an anticlockwise direction as viewed in the drawing, indicated by the arrow denoted G'.

The transfer roller 8 has an outer cylindrical surface 14 presenting recessed areas or pockets 15, as discernible in the accompanying drawing, and is cantilever-mounted fashion to the free end of a respective drive shaft 17 carried, together with the roller 8, by the base frame 27.

The roller 8 is centered on a horizontal axis 18 parallel to the axis 13 first mentioned; both axes occupy a substantially horizontal common plane.

As illustrated in the drawing, the gumming roller 6 is set in rotation about its axis 13 by the relative shaft 12, which is coupled both to drive means (not illustrated) and by way of further transmission means (not illustrated) to the shaft 17 of the transfer roller 8, so that this same roller 8 can be set in rotation about the relative axis 18 at the same peripheral speed as the gumming roller 6.

In operation, during the gumming process, the transfer roller 8 rotates in the opposite direction to the gumming roller 6, as indicated by the arrow denoted D'.

The gumming roller 6 and the transfer roller 8 are thus set in counter-rotation and kept in contact one with another by actuators (not illustrated).

As discernible from the drawing, the surface 10 of the gumming roller 6 and the surface 14 of the transfer roller 8 engage in contact at a zone of tangency 11 coinciding with a straight line generator common to the two rollers, extending parallel to the axes of rotation 13 and 18, such that a trough 16 substantially of Vee section is created between the two rollers 6 and 8.

At the location of the trough 16, the direction of rotation G' of the gumming roller 6 and the direction of rotation D' of the transfer roller 8 are mutually opposed and convergent on the zone of tangency 11. Accordingly, the adhesive 4 delivered by the feed circuit 9 is able to accumulate in the trough 16, and form a pool.

The trough 16 is delimited longitudinally at the end faces of the two rollers 6 and 8 by a pair of lateral plates (not illustrated), serving to retain the pool of adhesive 4.

As illustrated in the drawing, the feed circuit 9 delivering the adhesive 4 comprises a tank 24 with an outlet pipeline 25 terminating above the trough 16, and is operated in such a way as to maintain a predetermined quantity of adhesive 4 in the selfsame trough, with the aid of a level sensor (not illustrated) connected to the control unit 23.

In the event of a stoppage affecting the filter tip attachment machine 1, the feed circuit 9 will be piloted by the control unit 23 to cease delivering the adhesive 4 to the trough 16. In addition, the control unit 23 causes the running web 2 of material to be distanced from the gumming roller 6 at the gumming station 7.

Also illustrated in the drawing is a spray head 19' such as will direct an atomized jet of water onto the surface 14 of the transfer roller 8. A similar spray head 19" positioned symmetrically to the first is designed to direct an atomized jet of water onto the surface 10 of the gumming roller 6. Both of the spray heads 19' and 19" present a nozzle 20 shaped in such a way as to play the jet of water uniformly over the surfaces 10 and 14 of the rollers 6 and 8. The spray heads 19' and 19" will be capable of atomizing cold water, hot water, water vapor, or readily atomizable aqueous solutions.

Lastly, the gumming device 3 comprises a circuit 21 delivering a cleaning liquid, presenting outlets furnished with nozzles 22 designed to release a flow of the selfsame liquid; more exactly, the nozzles 22 in question are placed respectively above and facing toward the surfaces 10 and 14 of the corresponding rollers 6 and 8. The circuit 21 is connected to a tank (not illustrated) containing a supply of cleaning liquid.

Simpler embodiments of the gumming device 3 might be implemented without one or other of the two spray heads 19' or 19" or without either, or without the circuit 21 delivering the cleaning liquid.

Placed beneath the gumming device 3 is a collection vessel 26 serving to catch any excess adhesive 4, or lumpy residues of the adhesive 4, together with the water and the cleaning liquid running off the rollers.

Should the filter tip attachment machine 1 be affected by prolonged stoppages when in use, the control unit 23 will proceed, after a predetermined interval of time has elapsed, to implement a sequence of steps that include emptying the trough 16 and cleaning the rollers 6 and 8, so as to ensure that the web 2 will be correctly gummed once normal operation of the feed unit 5 is restored.

The control unit 23 activates the circuit 21 to deliver the cleaning liquid, which is released from the nozzles 22 located above the rollers 6 and 8 of the gumming device 3.

At the same time, the control unit 23 will also activate the spray heads 19: the atomized pressure jets of water remove the residues of adhesive that will tend as a result of prolonged inactivity to clog in the recessed areas or pockets 15 presented by the surface 14 of the transfer roller 8, as well as washing away residual traces of the layers 4' of adhesive left on the surface 10 of the gumming roller 6.

Finally, the control unit 23 pilots the drive means to reverse the direction of rotation of the two rollers; more exactly, the gumming roller 6 is caused to rotate clockwise about the relative axis 13 in the direction denoted G", and the transfer roller 8 to rotate anticlockwise about the relative axis 18 in the direction denoted D" at a peripheral speed equal to that of the gumming roller 6. Thus, in the area of the trough 16, the directions of rotation G" and D" now diverge from the zone of tangency 11, and the pool of adhesive 4 formerly occupying the trough 16 consequently disappears.

The control unit 23 can be configured by defining a first control parameter, serving to establish a given interval of time at the end of which the selfsame unit 23 will initiate the sequence of steps whereby the trough 16 is emptied automatically and the rollers 6 and 8 are cleaned.

In addition, a second control parameter can be defined serving to indicate a predetermined duration of the automatic emptying and cleaning steps, following which the gumming device 3 will come to a stop.

Once the normal operating conditions of the filter tip attachment machine 1 have been restored, the control unit 23 will activate the feed circuit 9 to deliver the adhesive 4 and fill up the trough 16, then set the gumming roller 6 in rotation in the anticlockwise direction G', and the transfer roller 8 in the clockwise direction D', so that layers 4' of fresh adhesive can be applied to the web 2.

The invention claimed is:

1. A method of gumming a web of wrapping material in a filter tip attachment machine, using a gumming device that comprises: a gumming roller and a transfer roller rotatable about axes disposed horizontal and parallel one with another, turning in opposite directions and engaged in mutual contact at a zone of tangency coinciding with a shared straight line generator, thereby creating a trough between the respective cylindrical surfaces of the rollers at the zone of tangency, in which to hold a predetermined quantity of adhesive; a feed circuit delivering the adhesive to the trough; a drive mechanism by which the rollers are set in rotation about their respective axes; a control unit to which the feed circuit and drive mechanism are interlocked; and a gumming station at which the gumming roller revolves tangentially to the web of wrapping material, including the steps, implemented in an event of the machine being affected by a stoppage, of:

suspending delivery of the adhesive;

distancing the web of wrapping material from the gumming roller;

reversing the directions of rotation of the rollers, respectively, relative to the direction of rotation during normal operation, such that the trough is emptied gradually of adhesive.

2. A method as in claim 1, wherein the direction of rotation of the rollers is reversed at an end of a first predetermined interval of time, programmed by way of the control unit.

3. A method as in claim 2, wherein the first predetermined interval of time is between 5 and 30 minutes duration.

4. A method as in claim 3, including a further step of stopping the rotation of the rollers at an end of a second predetermined interval of time following the first predetermined interval of time, wherein the second interval of time is programmed by way of the control unit.

5. A method as in claim 4, wherein the second predetermined interval of time is between 10 and 20 minutes duration.

6. A method as in claim 5, including a further step of directing a pressurized fluid by first spray nozzles onto at least one of the cylindrical surfaces of the rollers.

7. A method as in claim 6, including a further step of directing a pressurized fluid by second spray nozzles onto at least one of the cylindrical surfaces of the rollers.

8. A method as in claim 1, including a further step of stopping the rotation of the rollers at an end of a second predetermined interval of time following the first predetermined interval of time, wherein the second interval of time is programmed by way of the control unit.

9. A method as in claim 8, wherein the second predetermined interval of time is between 10 and 20 minutes duration.

10. A method as in claim 9, including a further step of directing a pressurized fluid by first spray nozzles onto at least one of the cylindrical surfaces of the rollers.

11. A method as in claim 10, including a further step of directing a pressurized fluid by second spray nozzles onto at least one of the cylindrical surfaces of the rollers.

12. A method as in claim 1, including a further step of directing a pressurized fluid by first spray nozzles onto at least one of the cylindrical surfaces of the rollers.

13. A method as in claim 12, including a further step of directing a pressurized fluid by second spray nozzles onto at least one of the cylindrical surfaces of the rollers.

* * * * *